(12) United States Patent
Smith et al.

(10) Patent No.: US 8,162,409 B2
(45) Date of Patent: Apr. 24, 2012

(54) GRADUATED TRAIN BRAKING

(75) Inventors: Eugene A. Smith, Satellite Beach, FL (US); Steven Andrew Kellner, Melbourne, FL (US); Glen Paul Peltonen, Palm Bay, FL (US); Brian Lee Staton, Palm Bay, FL (US)

(73) Assignee: General Electric Company, Schenectady, NY (US)

( * ) Notice: Subject to any disclaimer, the term of this patent is extended or adjusted under 35 U.S.C. 154(b) by 1361 days.

(21) Appl. No.: 11/067,440

(22) Filed: Feb. 25, 2005

(65) Prior Publication Data
US 2006/0012246 A1 Jan. 19, 2006

Related U.S. Application Data

(60) Provisional application No. 60/588,094, filed on Jul. 15, 2004.

(51) Int. Cl.
*B60T 13/00* (2006.01)
*B60T 8/88* (2006.01)

(52) U.S. Cl. ......... 303/9.62; 303/157; 303/158; 701/70; 246/6

(58) Field of Classification Search ............. 303/9, 9.62, 303/9.66, 20, 28, 122, 122.15, 157, 158; 701/19, 20, 70, 76; 246/6, 14
See application file for complete search history.

(56) References Cited

U.S. PATENT DOCUMENTS

| | | | |
|---|---|---|---|
| 3,799,623 A * | 3/1974 | Wickham et al. ............... 303/20 |
| 4,190,220 A | 2/1980 | Hahn et al. | |
| 4,344,138 A | 8/1982 | Frasier | |
| 4,495,578 A | 1/1985 | Sibley et al. | |
| 4,835,693 A | 5/1989 | Smith et al. | |
| 5,505,531 A * | 4/1996 | Griffith et al. ................ 303/126 |
| 5,662,389 A | 9/1997 | Truglio et al. | |
| 5,785,392 A | 7/1998 | Hart | |
| 5,984,427 A | 11/1999 | Kettle, Jr. | |
| 6,189,980 B1 | 2/2001 | Kull | |
| 6,217,126 B1 * | 4/2001 | Kull ................................ 303/3 |
| 6,401,015 B1 * | 6/2002 | Stewart et al. .................. 701/19 |
| 6,609,769 B2 | 8/2003 | Hart et al. | |
| 6,626,506 B2 | 9/2003 | Kettle, Jr. | |
| 7,079,926 B2 * | 7/2006 | Kane et al. ..................... 701/19 |
| 2003/0205927 A1 | 11/2003 | Kettle, Jr. | |
| 2006/0015233 A1 * | 1/2006 | Olsen et al. .................... 701/50 |

FOREIGN PATENT DOCUMENTS

DE 44 09 632 A 1 9/1994

* cited by examiner

*Primary Examiner* — Melody Burch
(74) *Attorney, Agent, or Firm* — GE Global Patent Operation; John A. Kramer

(57) ABSTRACT

A system (10) and method for automatically controlling braking of a train (38). The method includes applying a first degree of braking to the train during a first period of time, and then applying a second degree of braking to the train during a second time period following the first time period so that the train is slowed in a manner effective to limit a peak deceleration rate experienced by the train. The system includes a sensor (36) providing a signal indicative of an operating condition of a locomotive of the train requiring braking of the train, a memory (22) storing a braking schedule, and a processor (18) comprising logic executable for accessing the braking schedule stored in the memory responsive to the signal to automatically control braking of the locomotive according to the schedule.

4 Claims, 1 Drawing Sheet

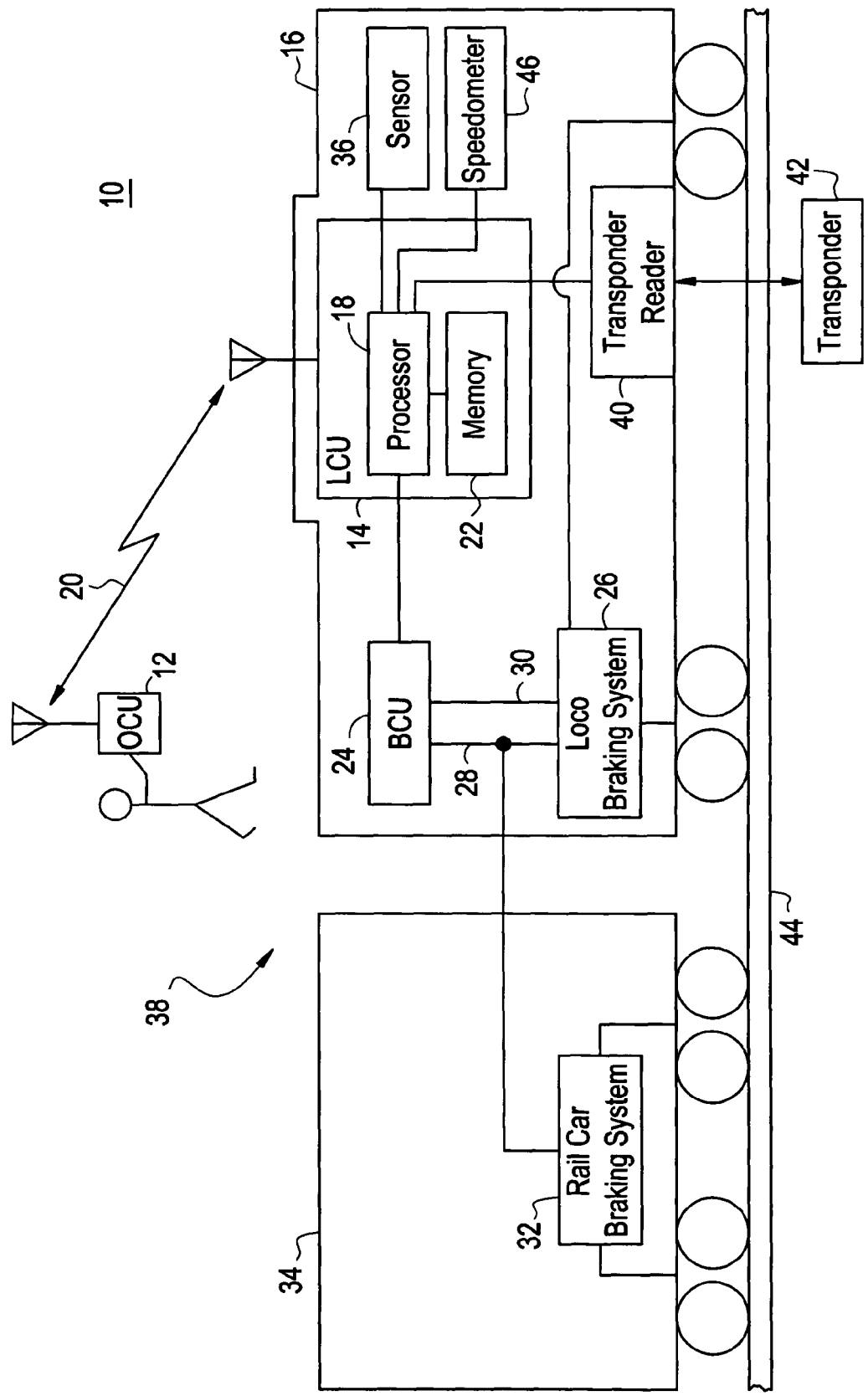

GRADUATED TRAIN BRAKING

CROSS REFERENCE TO RELATED APPLICATIONS

This application claims priority to U.S. Provisional Application Ser. No. 60/588,094 filed on Jul. 15, 2004 and incorporated herein by reference.

FIELD OF THE INVENTION

This invention relates generally to the field of locomotive control, and more particularly to automatically controlling application of train brakes responsive to a sensed condition.

BACKGROUND OF THE INVENTION

It is known to remotely control locomotives in a rail yard using remote radio transmitting devices controlled by rail yard personnel. Such remote control systems may include an operator control unit (OCU) or control tower unit in remote communication with a locomotive control unit (LCU) on board the locomotive. The LCU interfaces with known locomotive systems, such as locomotive traction control systems, and pneumatic train braking systems, to direct the locomotive to move and stop according to transmitted commands. For example, the LCU may provide commands to an automatic braking system for controlling braking of the locomotive (and any other locomotive or rail cars pneumatically attached to the locomotive) by modulating an air pressure in a brake pipe. The LCU may also provide commands to an independent braking system for controlling braking of the locomotive, independently of the automatic system, by modulating an air pressure in a locomotive pipe. In addition, the LCU may command a "bail" capability to control automatic braking of the locomotive independently of automatic braking applied to the rest of the train.

Under certain conditions, such as when the LCU detects a system fault, the LCU may automatically control operation of the locomotive until the fault is corrected. For example, the LCU may automatically stop movement of the locomotive by activating train braking systems when a certain fault is detected.

BRIEF DESCRIPTION OF THE DRAWINGS

The sole FIGURE is a block diagram of a locomotive control system for automatically controlling application of train brakes.

DETAILED DESCRIPTION OF THE INVENTION

The present inventors have observed that the application of locomotive brakes by automatic operation of a locomotive control system may result in braking forces that have potentially adverse effects in some applications. It is desired to automatically control brake application in locomotives being operated under LCU control, such as remotely via an off-board OCU, in a graduated manner to avoid excessive forces applied to a train rider as a result of applying the train brakes. For example, if a remotely controlled locomotive is commanded to apply train brakes too quickly in response to a fault condition, a train rider on the locomotive may be abruptly thrown forward and may be injured as a result of overly aggressive braking that results in a decelerations, or g-forces, sufficient to cause unintended movement of a rider on the locomotive. Additionally, when the locomotive decelerates quickly, the freight cars may not decelerate as quickly and may subsequently run in to the locomotive, causing unexpected acceleration and significant in-train forces, which may result in the rider being thrown backwards. Accordingly, the inventors have innovatively developed a graduated brake application schedule that may be used, for example, to progressively command application of train brakes when a fault condition requiring the train to be stopped is sensed.

The sole FIGURE is a block diagram of locomotive remote control system 10 for automatically controlling application of train brakes. The system 10 may include an OCU 12 in wireless communication with an LCU 14 on-board a remotely controlled locomotive 16. The LCU 14 may include a processor 18 receiving commands over wireless link 20 and operating locomotive systems in response to OCU generated commands. The processor 18 may access a memory 22 based on information transmitted from the OCU 12 and/or based on sensed conditions of the locomotive 16. The processor 18 may receive feedback from one or more sensors 36 monitoring conditions of the locomotive 16. The processor 18 may receive acceleration/deceleration information from an accelerometer, or acceleration/deceleration information may be derived from a locomotive speedometer 46. The processor 18 may control operations of the locomotive 16 in response to operator commands or to a transponder reader 40 sensing transponders 42, such as RFID tags encoded with locomotive operation parameters, positioned along a rail 44 being traversed by the locomotive 16.

The LCU 14 may be in communication with a Brake Control Unit (BCU) 24 that controls a locomotive pneumatic braking system 26 via a brake pipe 28 (automatic brakes) and/or a locomotive pipe 30 (independent brakes). The BCU 24 may also control a rail car pneumatic braking system 32 of a rail car 34, and/or a locomotive pneumatic braking system of another locomotive (not shown), pneumatically connected to the locomotive 16 via the brake pipe 28 to form a train 38. As used herein, the term "train brakes" is meant to include either or both of the automatic brakes and the independent brakes or other braking system of a locomotive, a rail car or a train.

Certain conditions of the locomotive 16 may require the LCU 14 to automatically control operation of the locomotive 16 until the condition is corrected. For example, if a predetermined fault condition is sensed by the LCU 14, such as the locomotive 16 operating outside prescribed operating parameters, or failures of locomotive 16 or LCU 14 components, the LCU 14 may command the locomotive 16 to enter a "Park State" until the fault can be corrected. To enter the Park State, the LCU 14 may command the BCU 24 to control the train brakes, including the locomotive pneumatic braking system 26, and/or any rail car pneumatic braking systems 32 connected to the locomotive 16, to stop the train 38. In the past, if a Park State was indicated, the LCU 14 commanded the BCU 24 to immediately apply full independent braking (via the locomotive pipe 30) and full automatic braking (via the brake pipe 28) to stop the train 38 as quickly as possible. Typically, full brake application occurred within 13 seconds after the BCU commanded full braking. However, an unexpected deceleration experienced by a train rider under such braking conditions may cause the rider to be thrown forward, resulting in potential injury. In addition, an unexpected acceleration caused by rail cars running in to a braked locomotive may cause a rider to be thrown backward. A method for controlling braking of a locomotive to moderate a train deceleration rate that may cause a rider injury includes detecting an operating condition of the locomotive requiring braking, and then automatically controlling a braking system of the locomotive in response to the operating condition by progressively applying an increasing percentage of a fully applied braking condition until achieving the fully applied braking condition. Accordingly, the locomotive may be slowed in a manner effective to limit a peak deceleration rate experienced by the locomotive. Controlling the braking system of the locomotive may include progressively increasing brake application according to a graduated braking schedule having a plurality of braking level steps from an initial braking condition to the fully applied braking condition. Each step in the braking schedule may correspond to a respective predetermined time from the initial braking condition. The braking schedule may be stored in the memory 22 and accessed by the processor 18 of the LCU 14 to provide graduated braking of the locomotive 16 when a fault requiring braking is detected, such as by sensor 36. An exemplary graduated braking schedule is shown in Table 1 below:

TABLE 1

Graduated Braking Schedule

| Time (s) | Commanded Independent Brake Level (%) | Example Commanded Independent Brake for J1 Valve (psi) | Example Commanded Independent Brake for J1.6 Valve (psi) | Commanded Automatic Brake Level (psi reduction) | Bail |
|---|---|---|---|---|---|
| 0 | 0 | 0 | 0 | 0 | N/A |
| 1 | 3 | 6 | 6 | 7 | Yes |
| 2 | 6 | 6 | 6 | 7 | Yes |
| 3 | 9 | 6 | 6.5 | 7 | Yes |
| 4 | 12 | 6 | 8.5 | 7 | Yes |
| 5 | 15 | 7 | 11 | 7 | Yes |
| 6 | 18 | 8 | 13 | 7 | Yes |
| 7 | 21 | 9.5 | 15 | 7 | Yes |
| 8 | 24 | 11 | 17.5 | 7 | Yes |
| 9 | 27 | 12 | 19.5 | 7 | Yes |
| 10 | 30 | 13.5 | 21.5 | 7 | Yes |
| 11 | 33 | 15 | 24 | 20 | Yes |
| 12 | 36 | 16 | 26 | 20 | Yes |
| 13 | 39 | 17.5 | 28 | 20 | Yes |
| 14 | 42 | 19 | 30 | 20 | Yes |
| 15 | 45 | 20.5 | 32.5 | 20 | Yes |
| 16 | 48 | 21.5 | 34.5 | 20 | Yes |
| 17 | 51 | 23 | 36.5 | 20 | Yes |
| 18 | 54 | 24.5 | 39 | 20 | Yes |
| 19 | 57 | 25.5 | 41 | 20 | Yes |
| 20 | 60 | 27 | 43 | 20 | Yes |
| 21 | 63 | 28.5 | 45.5 | 20 | Yes |
| 22 | 66 | 29.5 | 47.5 | 20 | Yes |
| 23 | 100 | 45 | 72 | 26 | No |

The exemplary braking schedule depicted in Table 1 applies a 3% commanded increase per second in an independent (locomotive only) braking level in a series of steps from an initial non-braking condition until reaching a fully applied commanded braking level of 100%. Compared to more aggressively applied braking in conventional remote control systems for braking a train in response to a fault condition, the graduated braking schedule of Table 1 provides a more limited deceleration that is sufficiently moderated to reduce a chance of injury to a train rider. In addition, such a graduated braking schedule may mitigate the effects of rail car run-in by gradually slowing the rail cars and/or the locomotive 16. The schedule shown in Table 1 may be implemented by storing the schedule as a look-up table in memory 22.

The "Time" column in Table 1 indicates the number of seconds elapsed from declaration of a fault condition, such as a Park State declaration indicated by the processor 18 in response to a sensed condition of the locomotive 16. The "Commanded Independent Brake Level" column lists the independent brake level percentages for each second of graduated braking to control the locomotive independent braking. In an aspect of the invention, once the independent brake level has been commanded to between 50% and 80% of full application, the next time increment applies the brakes fully, or 100% application of the independent brakes. Preferably, once the independent brake level has been commanded to between 60% and 70% of full application, the next time increment applies the brakes fully, or 100% application of the independent brakes. For example, it is believed that by a time when 66% of full application of the brakes has been applied, most of the slack action should be out of the train, so that no more run-in jolting would be experienced by the operator on the locomotive, so there would be no need to continue with a graduated braking schedule.

The "Example Commanded Independent Brake for J1 Valve (psi)" lists a locomotive brake cylinder pressure in pounds per square inch (psi) values commanded (for example, by the BCU 24 in response to the processor 18) corresponding to the percentage of brake application for each second of graduated braking for a locomotive braking system 26 equipped with a J1 type valve as is commonly used on locomotives manufactured by the assignee of the present invention. The "Example Commanded Independent Brake for J1.6 Valve (psi)" column lists the locomotive brake cylinder pressure psi values commanded (for example, by the BCU 24 in response to the processor 18) corresponding to the percentage of brake application for each second of graduated braking for a locomotive braking system 26 equipped with a J1.6 type valve as is commonly used on locomotives manufactured by the assignee of the present invention. The "Commanded Automatic Brake Level (psi reduction)" column lists the psi values commanded for automatic braking, for example, by the BCU 24 in response to the processor 18. The Commanded Automatic Brake Levels correspond to the percentage of brake application for each second of graduated braking. The "Bail" column indicates whether an automatic braking of the locomotive 16 should be commanded to be bailed, or released, corresponding to each second of graduated braking. In an aspect of the invention, the automatic brakes are bailed for the duration of graduated braking until a full application brake state is reached (e.g. 100% application), for example, at 23 seconds, according to the exemplary schedule of Table 1. Bailing of the locomotive brakes in this manner reduces the amount of deceleration of the locomotive and increases the amount of deceleration of any rail cars that are connected to the brake pipe and being pulled by the locomotive, thereby reducing the amount of run in of the rail cars.

In another aspect of the invention, the schedule shown in Table 1 may be modified to command certain levels of braking according to a desired deceleration of the locomotive so that a rider does not experience excessive deceleration forces that may cause the rider injury. For example, each step may represent a certain deceleration force, or g-force, level to be maintained at that step. Accordingly, at each step, the processor 18 may control braking of the locomotive 16 to achieve a respective programmed deceleration level stored in the braking schedule. A level of brake application may be different for different circumstances to achieve the same deceleration. For example, variable conditions such as length of train, weight of train, weather conditions, track inclination, and a degree of run-in may require different levels of brake application to achieve the same deceleration. Feedback from the accelerometer or speedometer 46 (acceleration/deceleration may be calculated from speed of the locomotive over time) may be used to achieve the desired level of deceleration corresponding to the schedule. In an exemplary embodiment, a progressively increasing deceleration force may be scheduled, such as 0.1 G at one second, 0.3 G at two seconds, 0.5 G at 3 seconds and so forth until reaching a desired peak deceleration force, which may be maintained until the locomotive 16 is stopped. Such a schedule of gradually increasing deceleration forces may allow a passenger to perceive that the train is being automatically braked and allow the passenger to prepare, such as by holding onto fixed object in the locomotive, for progressively higher deceleration forces expected to be applied by increasingly aggressive braking. In another embodiment, first degree of braking of the train may be applied during a first period of time and a second degree of braking of the train may be applied during a second time period following the first time period. For example, a progressive braking schedule based on an increasing deceleration force may be applied for the first portion of a braking period and then, once a certain peak deceleration force has been achieved, the brakes may be fully applied for the second portion of the braking period until the locomotive 16 is stopped.

A graduated braking schedule, such as the schedule depicted in Table 1, may be overridden or ignored under certain circumstances. For example, if automatic and/or independent brakes on a locomotive 16 are already being applied at a time when a fault requiring braking occurs, the locomotive 16 may be instructed to apply the brakes in a more restrictive manner between a current brake application level and a brake application level that would be applied according to the graduated schedule. If the train brakes are currently being applied more quickly than the graduated schedule would apply the brakes when the fault occurs, then the locomotive 16 may be commanded to override the graduated schedule. In another example, if a certain amount of braking is already being applied when a fault occurs, such as if the a brake cylinder pressure of the locomotive brakes is greater than 25 psi, then graduated braking may be overridden. If the locomotive 16 is already stopped when a fault requiring stopping occurs, graduated braking may be overridden. If the locomotive is moving when a fault requiring stopping occurs, thereby invoking a graduated braking, if the locomotive is then stopped by the operator before the graduated braking schedule is completed, graduated braking may be overridden.

In yet another example, if the locomotive 16 is being automatically controlled while pulling into a pullback track using, for example, known AEI tag remote control techniques, graduated braking may be overridden. It may be necessary to override graduated braking because pullback tags are typically configured based on non-graduated levels of braking, so that the fixed distances associated with the AEI tags may not accommodate the longer stopping distances that may be needed with graduated braking. However, graduated braking may be used when shoving out of the pullback track where stopping distances may not be as critical. In another example, if the locomotive 16 is operating in a coast mode and reaches an overspeed condition while coasting, graduated braking may be overridden. In still yet another example, the graduated schedule may be selectively disabled.

In yet another example, if graduated braking is being applied to the locomotive 16 as a result of a fault, and the rider then commands the locomotive 16 to stop via the OCU 12, then the graduated braking schedule may be overridden and the independent and automatic brakes may be fully applied. In another aspect, if graduated braking is being applied to the locomotive, for example by applying a 3% increase in braking per second, if the locomotive 16 is sensed to still be increasing in speed, a more aggressive braking schedule may be applied, such as by increasing the level pf brake application in the graduated schedule to a 6% increase in braking per second.

Based on the foregoing specification, the invention may be implemented using computer programming or engineering techniques including computer software, firmware, hardware or any combination or subset thereof, wherein the technical effect is to perform automatic locomotive braking in response to a sensed fault condition. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

We claim:

1. A method for automatically controlling braking of a train being moved by a locomotive having a control system onboard for remotely controlling train operations comprising:
 applying a first degree of braking to a train during a first time period when the locomotive is being remotely controlled via an onboard control system in an absence of control inputs from an onboard operator, the first degree of braking based on a first deceleration force selected so that the train is slowed in a manner effective to limit a peak deceleration rate experienced by the train sufficient for reducing unintended movement of a rider onboard the train; and
 applying a second degree of braking to the train during a second time period following the first time period.

2. The method of claim 1, wherein the second degree of braking is controlled based on a second deceleration force.

3. The method of claim 1, wherein the first and second degrees of braking are further controlled based on a percentage of a fully applied braking force.

4. The method of claim 1, wherein the second degree of braking comprises a fully applied braking force.

* * * * *